United States Patent

Seilly

[15] 3,651,356
[45] Mar. 21, 1972

[54] WAVE WINDING FOR DYNAMO ELECTRIC MACHINE

[72] Inventor: Alec Harry Seilly, North Wembley, England

[73] Assignee: C.A.V. Limited, Birmingham, England

[22] Filed: June 12, 1970

[21] Appl. No.: 45,885

[30] Foreign Application Priority Data

June, 1969 Great Britain.....................30,116/69

[52] U.S. Cl..............................................310/180, 310/202
[51] Int. Cl. ......................................................H01v 3/28
[58] Field of Search...................310/179, 207, 180, 184, 188, 310/155, 202, 208, 198, 166, 162, 216; 242/1.1

[56] References Cited

UNITED STATES PATENTS

| | | | |
|---|---|---|---|
| 2,289,673 | 7/1942 | Neumeister et al.....................310/179 |
| 2,622,217 | 12/1952 | Anderson..............................310/166 |
| 3,328,617 | 6/1967 | Preece..................................310/180 |

FOREIGN PATENTS OR APPLICATIONS

| | | | |
|---|---|---|---|
| 19,732 | 2/1936 | Australia...............................310/180 |
| 1,188,515 | 4/1970 | Great Britain........................310/179 |

OTHER PUBLICATIONS

Siskind, Induction Motors, McGraw-Hill Book Co., 1958, pp. 81– 84, 66, 67.

Primary Examiner—William M. Shoop, Jr.
Assistant Examiner—B. A. Reynolds
Attorney—Holman & Stern

[57] ABSTRACT

A dynamo electric machine having four pole pieces and windings through which electric current can be passed to polarize the pole pieces, the winding being formed by physically deforming a pair of coils having equal length, the deformation of the coils producing four substantially straight coil portions which are disposed between adjacent pole pieces respectively. The end connectors for each coil are spaced by 180°.

1 Claims, 3 Drawing Figures

WAVE WINDING FOR DYNAMO ELECTRIC MACHINE

This invention relates to dynamo electric machines of the kind comprising an armature having a commutator and a field structure including four pole pieces and windings through which electric current can be passed to polarize the pole pieces.

In known dynamo electric machines of this kind the windings are individually wound and have an equal number of turns. In this case providing that the current flowing in each winding is equal then the number of ampere turns will also be equal. This form of constructions has been superseded in certain types of machine by a wave winding in which a single coil is provided which is physically deformed to elongated generally annular form so that between each pair of pole pieces there is disposed a straight portion of coil, the adjacent straight sections being interconnected by curved end portions. With this arrangement the number of ampere turns is unequal. For a single turn coil the difference in the number of ampere turns is at a maximum and if in one pair of adjacent coil portions the number of ampere turns is 1 then in the other pair of coil portions the number of ampere turns will be 1.5. This difference decreases as more turns are provided on the coil however, the number of turns which can be provided is limited so that the flux density in each pole piece can never be equal. This applies particularly in the case of a series connected motor and can lead to poor commutation. The object of the invention is to provide a machine of the kind specified having a wave winding in which the flux density in each pole piece will be substantially equal.

According to the invention in a dynamo electric machine of the kind specified the windings are formed by a pair of coils of equal length which are deformed so as to define four straight coil portions disposed between adjacent pole pieces respectively, the ends of the coils being disposed at 180° relative to each other.

One example of a dynamo electric machine in accordance with the invention will now be described with reference to the accompanying drawings in which.

Figure 1:
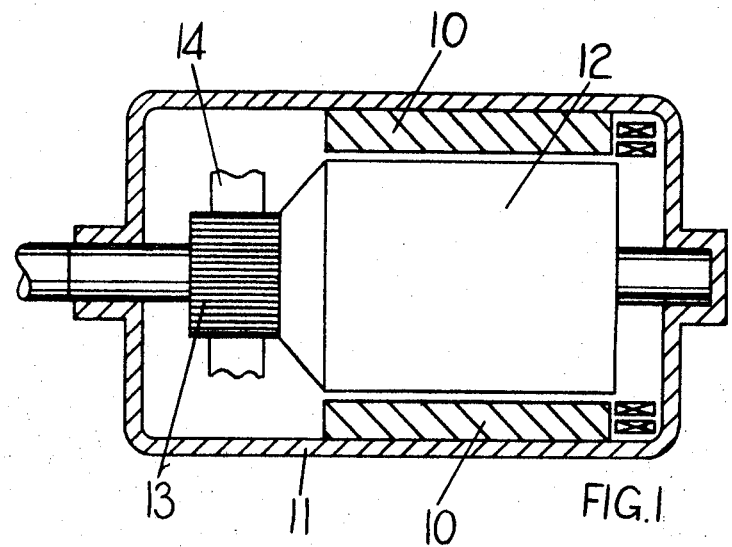
FIG. 1 is a part sectional side elevation of a series wound motor.

Referring to FIG. 1 the dynamo electric machine includes four pole pieces 10 which are secured to the internal periphery of an annular stator structure 11 at equiangularly spaced intervals. Rotatably supported within the stator structure 11 is an armature 12 having a commutator 13 with which cooperates a brush set 14 through which electric current can flow to the armature. The particular form of dynamo electric machine under consideration is an electric starting motor for an internal combustion engine and in this arrangement the field windings and the armature are connected in series.

Figure 2:
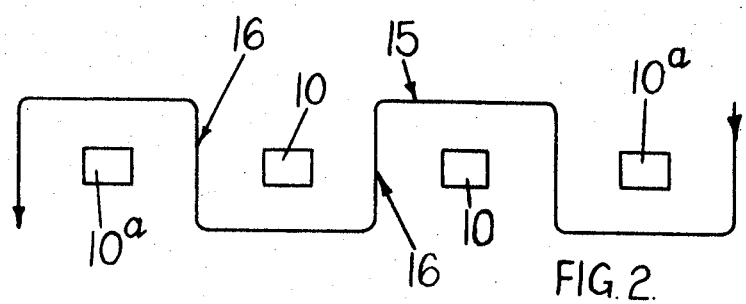
FIG. 2 shows a developed view of the field windings of the conventional machine.
Figure 3:
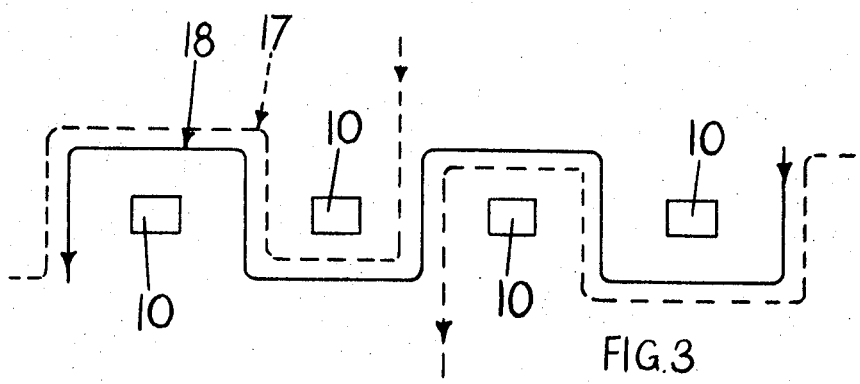
FIG. 3 shows a developed view of a machine having a winding modified in accordance with the invention.

As shown in FIG. 2 the field winding of known machines comprises a coil 15 having a single turn. The coil is deformed so as to define straight portions 16 which lie between adjacent pole pieces 10 respectively. If for example, the current flowing in the winding equals one amp., then the effective ampere turns in two adjacent pole pieces 10 is also 1 but in the other two pole pieces 10a it equals 1.5. This difference is due to the end portions of the coil. The degree of unbalance can be lessened by providing more turns on the coil however, the number of turns which can be provided is limited and the resulting unequal flux density in the pole pieces can lead to poor commutation.

In order to avoid the unequal magnetization of the pole pieces the winding is formed by two separate coils 17, 18 of equal length. The connecting leads to the two coils are spaced by 180° and in this manner the pole pieces are magnetized to the same extent providing the current flowing in each coil is equal. In the particular example if the current flowing in each coil is one-half A., then the effective ampere turns in each pole piece equals 1.25.

It will be understood that in practice the coils will be provided with more than one turn and that they may be connected in parallel with each other or in series.

Having thus described my invention what I claim as new and desire to secure by Letters Patent is:

1. A dynamo electric machine of the kind comprising an armature, a commutator mounted on the armature, brushes bearing on the commutator and through which electric current flows in the armature, a field structure comprising four pole pieces disposed about the armature and a field winding mounted about the pole pieces for magnetically polarizing same, said field winding including straight portions disposed intermediate adjacent pole pieces, adjacent straight portions being interconnected at one end by means of curved portions of the winding to define an annular wave winding having portions extending adjacent three sides of each pole piece, the winding comprising a pair of coils, each coil having a lead-in portion and a leadout portion said portions being adjacent each other, and the coils being displaced relative to each other by an amount so that the lead-in and leadout portions of one coil are disposed at a position in the winding displaced by 180° relative to the lead-in and leadout portions of the other coil.

* * * * *